(12) United States Patent
Musale et al.

(10) Patent No.: US 9,850,154 B2
(45) Date of Patent: Dec. 26, 2017

(54) METHOD OF REDUCING INDUSTRIAL WATER USE

(71) Applicant: ECOLAB USA INC., Saint Paul, MN (US)

(72) Inventors: Deepak A. Musale, Aurora, IL (US); Yogesh Bhole, Pune (IN); Vaideeswaran Sivaswamy, Pune (IN)

(73) Assignee: ECOLAB USA INC., St. Paul, MN (US)

( * ) Notice: Subject to any disclaimer, the term of this patent is extended or adjusted under 35 U.S.C. 154(b) by 738 days.

(21) Appl. No.: 14/143,764

(22) Filed: Dec. 30, 2013

(65) Prior Publication Data
US 2015/0183673 A1 Jul. 2, 2015

(51) Int. Cl.
*C02F 9/02* (2006.01)
*B08B 9/28* (2006.01)
(Continued)

(52) U.S. Cl.
CPC ............... *C02F 9/00* (2013.01); *B08B 9/28* (2013.01); *B08B 13/00* (2013.01); *C02F 1/28* (2013.01); *C02F 1/38* (2013.01); *C02F 1/441* (2013.01); *C02F 1/442* (2013.01); *C02F 1/444* (2013.01); *C02F 1/52* (2013.01); *C02F 2103/02* (2013.01); *C02F 2103/023* (2013.01); *C02F 2103/32* (2013.01); *C02F 2103/325* (2013.01); *C02F 2303/04* (2013.01); *C02F 2303/20* (2013.01); *C02F 2303/24* (2013.01)

(58) Field of Classification Search
CPC .... C02F 9/00; C02F 1/28; C02F 1/441; C02F 1/442; C02F 1/444; C02F 1/52; C02F 2103/02; C02F 2103/023; C02F 2103/32; C02F 2103/325; C02F 2103/04; C02F 2103/20; C02F 2103/24; B08B 9/28; B08B 13/00
USPC ............................................... 134/10, 13, 26
See application file for complete search history.

(56) References Cited

U.S. PATENT DOCUMENTS

| | | | |
|---|---|---|---|
| 5,514,282 A | * | 5/1996 | Hibbard ................ B01D 61/04 210/195.2 |
| 5,888,311 A | | 3/1999 | Laufenberg et al. |

(Continued)

FOREIGN PATENT DOCUMENTS

| | | | |
|---|---|---|---|
| CN | 203196456 U | * | 9/2013 |
| EP | 1160019 A1 | | 12/2001 |

(Continued)

*Primary Examiner* — Katelyn B Whatley
(74) *Attorney, Agent, or Firm* — Eric D. Babych; Brinks Gilson & Lione

(57) ABSTRACT

The invention provides methods and compositions for reducing the amount of water required in an industrial process, especially a bottling process such as beer or beverage manufacturing. The method comprising the steps of: collecting water used to rinse cleaned and/or dirty recycled bottles, spraying the collected water at a food contacting piece of equipment as part of a CIP rinse, and passing the CIP second rinse water into a cooling tower as make-up water. The method allows for the re-use of water already in the system but by being careful where each water stream goes the water does not accumulate contaminants that would damage the cooling tower or foul the bottled product or vessel that is cleaned by CIP method.

5 Claims, 2 Drawing Sheets

(51) Int. Cl.
    *C02F 9/00*         (2006.01)
    *B08B 13/00*      (2006.01)
    *C02F 1/28*         (2006.01)
    *C02F 1/44*         (2006.01)
    *C02F 1/52*         (2006.01)
    *C02F 1/38*         (2006.01)
    *C02F 103/32*     (2006.01)
    *C02F 103/02*     (2006.01)

(56) References Cited

U.S. PATENT DOCUMENTS

| | | | |
|---|---|---|---|
| 6,234,567 | B1 | 5/2001 | Melchger et al. |
| 6,797,073 | B1 * | 9/2004 | Teruggi ............. B03B 5/02 |
| | | | 134/10 |
| 7,632,412 | B2 * | 12/2009 | Johnson ............ C02F 1/008 |
| | | | 210/662 |
| 8,398,781 | B2 | 3/2013 | Herdt et al. |
| 2003/0015219 | A1 | 1/2003 | Kravitz et al. |
| 2005/0011839 | A1 | 1/2005 | Dart et al. |
| 2007/0278151 | A1 * | 12/2007 | Musale ............... C02F 1/56 |
| | | | 210/636 |
| 2008/0060999 | A1 | 3/2008 | Musale et al. |
| 2009/0199875 | A1 | 8/2009 | Fernholz et al. |
| 2010/0051559 | A1 * | 3/2010 | Musale ............... C02F 5/12 |
| | | | 210/701 |
| 2013/0056413 | A1 | 3/2013 | Miranzadeh et al. |

FOREIGN PATENT DOCUMENTS

| | | | |
|---|---|---|---|
| JP | 2000292092 | A * | 10/2000 |
| WO | 2011131963 | A2 | 10/2011 |

* cited by examiner

METHOD OF REDUCING INDUSTRIAL WATER USE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to compositions, methods, and apparatuses for reducing the amount of water required for various water using stages of a beverage manufacturing operation.

Beverage manufacturing operations (both alcoholic and non-alcoholic) require the use of water in many stages. These stages can include but are not limited to pasteurization, vacuum pump sealing, fermentation, kettle brewing, and bottle washing. In addition equipment and maintenance operations such as cooling towers, heat exchangers, boilers, floor-washing, and crate-washing also require water.

The use of so much water in beverage manufacturing operations results in water costs being one of (if not the) dominant cost of operations. As result there is ongoing desire to reduce the use of water in beverage manufacturing operations. Ideally to reduce water use one would take the used water from one such operation and use it as a feed source to another use. In practice however this is mostly impossible because the various uses in the stages of beverage manufacturing operations render the water unfit as a feed stock. As a result there is clear utility in novel methods of reducing the use of water in a beverage manufacturing operation.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

To satisfy the long-felt but unsolved needs identified above, at least one embodiment of the invention is directed towards a method of reducing the amount of process fluid required in an industrial process. The method comprising the steps of: collecting fluid used to rinse cleaned and/or dirty recycled bottles, applying a CIP rinse process to a food contacting piece of equipment, the CIP rinse process comprising at least one first rinse and at least one second rinse, spraying the collected fluid at a food contacting piece of equipment as at least part of the fluid used in the CIP first rinse, and passing the CIP second rinse fluid into a cooling tower as make-up fluid.

The piece of equipment may be a kettle used in brewhouse of a beer manufacturing process. The fluid may be water. The fluid may be conditioned after it is collected by a coarse particle removal step and/or a fine particle removal step. The device used for particle removal steps may include cyclone separator, centrifuge, screen filter, bag filter, paper filter, MMF, sand filter, MF, UF, and any combination thereof. The method may further comprise adding a flocculant to the fluid before particle removal step(s). An adsorbent may be added to the fluid before particle removal step(s). Acid may be added to the fluid before particle removal steps. The fluid may pass through a heat exchanger to reduce the fluid's temperature to ambient temperature. The heat exchanger may be cooled by the cooling tower water. The fluid may be all of the rinse water for first rinse is fluid from the bottle washer step. All of the cooling tower make-up water may be fluid from the CIP second rinse step.

At least one embodiment of the invention is directed towards a method of recycling bottle wash water for use in an industrial process. The method comprises the steps of: collecting fluid used to rinse cleaned and/or dirty recycled bottles, applying a treatment process adequate to remove sufficient amounts of colloidal and soluble contaminants thereby allowing the fluid to be used in an industrial process requiring water which is cleaner than the collected fluid. The method may further comprise: reducing the fluid to ambient temperature, adding adsorbent to adsorb some surfactants in the fluid, precipitating aluminum by reducing the pH to 6.5 to 7.0, clarifying the fluid to remove precipitated solids, removing residual solids by a method selected from those consisting of: MMF, MF, centrifugation, and any combination thereof, removing colloids by UF, and removing dissolved matter by RO. The fluid may then be passed to an industrial process fluid stream. The industrial process fluid stream includes but is not limited to CIP, pasteurizing, cooling tower, boiler, crate washing, belt lube, vacuum pump sealing, floor washing, and any combination thereof. A fresh water source may also be passed into the industrial process fluid stream, the amount of fresh water being insufficient for the industrial process to be successfully completed but for the presence of the fluid.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1:
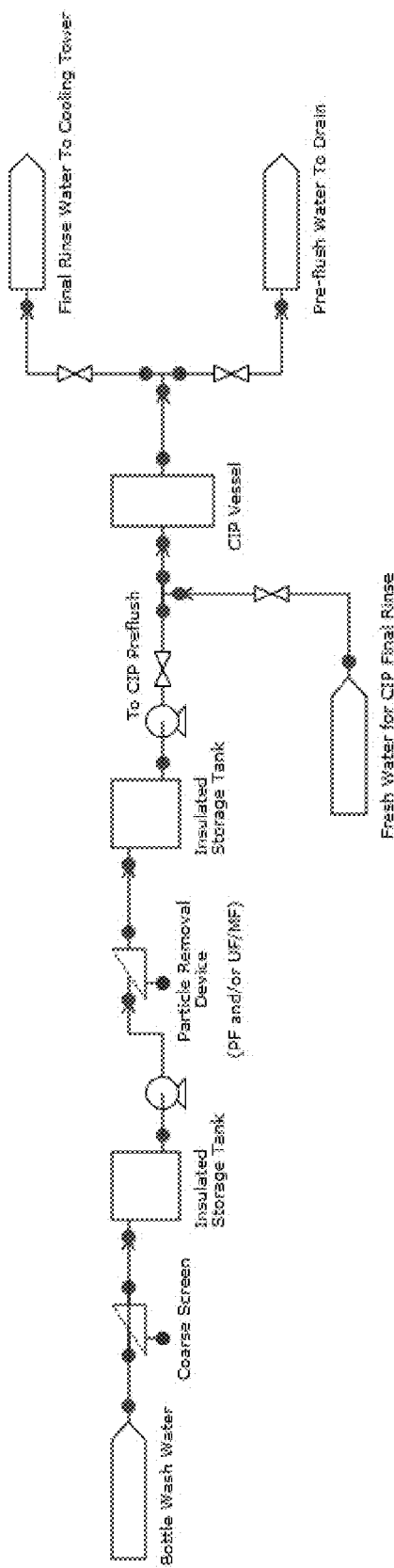
FIG. 1 is an illustration of a first possible example of reducing the use of water in a beverage manufacturing operations.

The following definitions are provided to determine how terms used in this application, and in particular how the claims, are to be construed. The organization of the definitions is for convenience only and is not intended to limit any of the definitions to any particular category.

"Coagulant" means a water treatment chemical often used in solid-liquid separation stage to neutralize charges of suspended solids/particles so that they can agglomerate, coagulants are often categorized as inorganic coagulants, organic coagulants, and blends of inorganic and organic coagulants, inorganic coagulants often include or comprise aluminum or iron salts, such as aluminum sulfate/chloride, ferric chloride/sulfate, polyaluminum chloride, and/or aluminum chloride hydrate, organic coagulants are often positively charged polymeric compounds with low molecular weight, including but not limited to polyamines, polyquaternaries, polyDADMAC, Epi-DMA, coagulants often have a higher charge density and lower molecular weight than a flocculant, often when coagulants are added to a liquid containing finely divided suspended particles, it destabilizes and aggregates the solids through the mechanism of ionic charge neutralization, additional properties and examples of coagulants are recited in *Kirk-Othmer Encyclopedia of Chemical Technology*, 5th Edition, (2005), (Published by Wiley, John & Sons, Inc.).

"Recirculating Heat Exchanger" means one or more pieces of equipment and/or a system, constructed and arranged to facilitate heating or cooling heat transfer to or from a fluid circulating or recirculating through the equipment/system, for purposes of this application the vernacular term "cooling tower" will encompass all forms of Recirculating Heat Exchangers, additional details and descriptions of Recirculating Heat Exchangers are provided in *The Nalco Water Handbook* (3rd Edition), by Daniel Flynn, McGraw Hill (2009) in general and in particular pp. 14.1-17.23.

"Blowdown" means fluid, typically water which has been repeatedly run through a cooling tower and has undergone repeated evaporations and as a result has accumulated such an excess of unwanted contaminants that it is removed from use as a heat exchange medium in a cooling tower.

"Make Up" means fluid, typically water which is added to fluid in a cooling tower to compensate for fluid lost to evaporation, to dilute recirculating fluid, and/or to compensate for removed blowdown.

"Cooling Tower" means a heat removal devices used to transfer process waste heat to the atmosphere, it commonly uses evaporation of water to remove process heat and cool the working fluid to near the wet-bulb air temperature, it includes both evaporative cooling tower and evaporative condensers.

"CIP" means clean in place.

"CIP first rinse or pre-rinse or pre-flush" refers to the step of removing loosely deposited process fluids and solids from the equipment and lines by another fluid, typically water, before the actual CIP with acid/base/detergent occurs.

"CIP second rinse or final rinse" refers to the step of removing residual CIP components such as acid, base and detergent from equipment and lines, typically using fresh water or water of equivalent quality. This step may or may not include additional sanitization step.

"Bottles" includes plastic, metal or glass bottles, cans, kegs or combinations thereof.

"Droplet" means a mass of dispersed phase matter surrounded by continuous phase liquid, it may be suspended solid or a dispersed liquid.

"Effective amount" means a dosage of any additive that affords an increase in one of the three quantiles when compared to an undosed control sample.

"Flocculant" means a composition of matter which when added to a liquid carrier phase within which certain particles are thermodynamically inclined to disperse, induces agglomerations of those particles to form as a result of weak physical forces such as surface tension and adsorption, flocculation often involves the formation of discrete globules of particles aggregated together with films of liquid carrier interposed between the aggregated globules, as used herein flocculation includes those descriptions recited in ASTME 20-85 as well as those recited in Kirk-Othmer Encyclopedia of Chemical Technology, 5th Edition, (2005), (Published by Wiley, John & Sons, Inc.), flocculants often have a low charge density and a high molecular weight (in excess of 1,000,000) which when added to a liquid containing finely divided suspended particles, destabilizes and aggregates the solids through the mechanism of interparticle bridging.

"Flocculating Agent" means a composition of matter which when added to a liquid destabilizes, and aggregates colloidal and finely divided suspended particles in the liquid, flocculants and coagulants can be flocculating agents.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Filter" means a structure constructed and arranged to remove suspended materials from within a liquid that is passed through it, more detailed descriptions of filters and filtration are described in *The Nalco Water Handbook* (3rd Edition), by Daniel Flynn, McGraw Hill (2009) in general and in particular pp. 6.1-8.30.

"MMF" means multi-media filter, more detailed descriptions of which are described in *The Nalco Water Handbook* (3rd Edition), by Daniel Flynn, McGraw Hill (2009) in general and in particular pp. 6.1-8.30.

"Membrane" means a structure having lateral dimensions much greater than its thickness though which a mass transfer may occur, membranes may be used to filter liquids.

"MF" means microfiltration, a membrane based separation process in which particles and dissolved macromolecules larger than 0.1 µm do not pass through the membrane, MF may be pressure driven.

"NF" means nanofiltration, a membrane based separation process in which particles and dissolved macromolecules larger than 1 nm do not pass through the membrane, NF may be pressure driven.

"RO" means reverse osmosis a water purification technology that uses a hydrostatic force (a thermodynamic parameter) to overcome osmotic pressure (a colligative property) in the water to remove one or more unwanted items from the water, RO may be a membrane based separation process, wherein the osmotic pressure is overcome by the hydrostatic force, it may be driven by chemical potential, RO may be pressure driven, RO can remove many types of molecules and ions from solutions and is used in both industrial processes and in producing potable water, in a pressurized RO process the solute is retained on the pressurized side of the membrane and the pure solvent is allowed to pass to the other side, to be "selective," an RO membrane may be sized to not allow large molecules or ions through the pores (holes), and often only allows smaller components of the solution (such as the solvent) to pass freely, in some cases dissolved molecules larger than 0.5 nm do not pass through membrane.

"Separation" means a mass transfer process that converts a mixture of substances into two or more distinct product mixtures, at least one of which is enriched in one or more of the mixture's constituents, it includes but is not limited to such processes as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"UF or Ultrafiltration" means a process of filtration in which hydrostatic pressure forces a filtrate liquid against a semipermeable membrane, suspended solids and solutes of high molecular weight are retained, while water and low molecular weight solutes pass through the membrane, it is used in industry and research for purifying and concentrating macromolecular ($10^3$-$10^6$ Da) solutions It may be applied in cross-flow or dead-end mode and separation in ultrafiltration may undergo concentration polarization. The exact metes and bounds and protocols for applying and categorizing ultrafiltration are elucidated in the scientific reference: *Ultrafiltration and Microfiltration Handbook, Second Edition*, by Munir Cheryan, Published by CRC Press LLC, (1998).

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

At least one embodiment of the invention is directed towards a method of reducing the use of water in an industrial process. The method involves utilizing bottle wash fluid in a CIP process and passing the CIP second rinse fluid into a cooling tower as make-up.

In at least one embodiment the wash fluid is wash water used in the process of cleaning recycled bottles in a bottle washer. As described in European Patent Application EP1160019, when bottles are recycled they undergo an intense washing process which may include soaking, scrubbing, boiling, and polishing. The final step of the intense washing process is spraying the interior of the essentially clean bottle with essentially clean water. This final step does not remove soil deposits from the bottle as they have already been removed. Rather this final step is solely for the purpose of removing residual cleaning chemicals.

The wash fluid is then used as a fluid source for the first rinse in a CIP process. As described for example in U.S. Pat. Nos. 6,326,340, 6,454,871, 6,027,572, 7,247,210, and 8,398,781, and European Patent Application 0 490 117 A1, CIP cleaning techniques are a specific cleaning regimen adapted for removing soils from the internal components of tanks, lines, pumps and other process equipment used for processing typically liquid product streams such as beverages, milk, juices, etc. CIP cleaning involves passing cleaning solutions through the system without dismantling any system components. The minimum CIP technique involves passing the cleaning solution through the equipment and then resuming normal processing. Any product contaminated by cleaner residue can be discarded. Often CIP methods involve a first rinse, the application of the cleaning solutions, a second rinse with potable water followed by resumed operations. The process can also include any other contacting step in which a rinse, acidic or basic functional fluid, solvent or other cleaning component such as hot water, cold water, etc. can be contacted with the equipment at any step during the process.

In at least one embodiment the CIP process is used to clean one or more pieces of equipment used in the manufacture of beverages. In at least one embodiment the CIP process is used to clean kettles located in the brewhouse of a beer manufacturing operation. In a beer manufacturing operation barley grains are soaked in a brewhouse kettle where alcohol is removed from excess water. The product then passes through a fermentation stage, a filtration stage, and is then bottled/packaged.

In at least one embodiment the fluid used as the CIP second rinse fluid is then added as make up to a cooling tower. As described in U.S. Pat. Nos. 6,280,635 and 7,632,412 and in US Published Patent Application 2013/0056413, as a cooling tower operates, its recirculating heat transferring fluid is constantly being lost to evaporation and blowdown. As a result make up fluid needs to be regularly added to the cooling tower.

While it is known in the industry in general that waste water from one process can theoretically be used as feed water for another, the specific uses of water/fluids as described above are taught away by the prior art. This is because each use of the water increases the accumulation of contaminants in the water and the entire purpose of make-up water is to undo the effects of accumulated contaminants. Fluids used to clean surfaces that come into contact with food such as those used in CIP are especially problematic as the CIP rinses use agents that would increase the likelihood of cooling tower fluid needing to be removed as blowdown.

Referring now to FIG. 1 there is shown a method of conditioning the bottle wash water for use in the CIP first rinse and CIP second rinse water to the cooling tower. Some or all of the bottle wash water passes through a coarse screen. The coarse screen removes/filters large suspended solids (up to 1 micrometer size or greater) by such mechanisms including but not limited to as a mesh screen filer or centrifuge. The effluent may then be stored in a tank. It is then passed to a particle removal stage which removes fine particle turbidity (up to 1 to 0.01 micrometer size or greater). The particle removal stage may include cyclone separator, centrifugation, screen filter, bag filter, paper filter, multimedia filtration, Microfiltration Ultrafiltration, or combination thereof. The coarse and fine particle removal may be accomplished in one step when UF or MF is used. It may be stored in a tank or holding container until it is applied to the first rinse of CIP process. This fluid after filtration may be optionally disinfected using chemical means hydrogen peroxide, peracetic acid, bleach, sodium or calcium hypochlorite, chlorine dioxide, chlorous acid, chloramines, ozone or using Ultraviolet (UV) radiation or combination thereof before using it in CIP rinse step. After the CIP process some or all of the applied second rinse water may be passed on to the cooling tower and/or to a drain.

In at least one embodiment, after the CIP second rinse the fluid is conditioned to remove any residual sanitizing agents (including but not limited to peracids, hypochlorite, and/or peroxides) still in the fluid, before using in cooling tower In at least one embodiment, monitoring and control devices and methods (including but not limited to IMCA-Instrumentation, Monitoring, Control and Automation) are used to confirm that the fluid streams are suitable for use in CIP or as cooling tower make-up, both in terms of quantity and quality of fluids. Representative examples of IMCA methods are described in the reference *Advances in Water Desalination*, 1st Edition, by Noam Lior, John Wiley and Sons, (2013).

Figure 2:
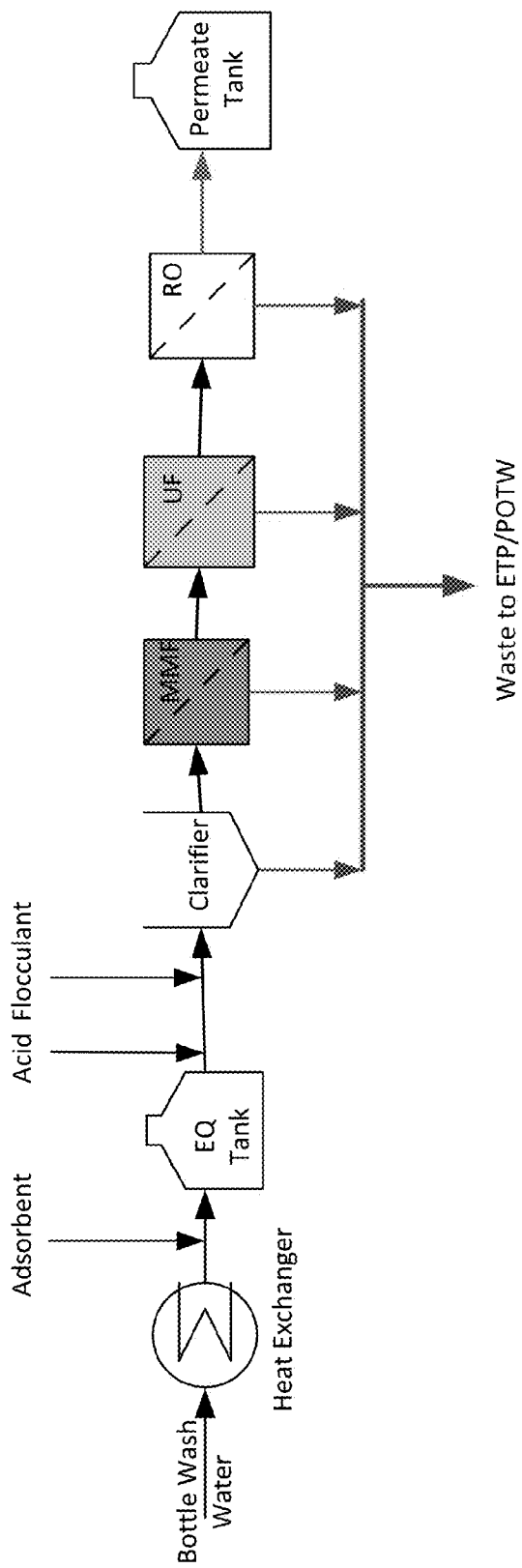
FIG. 2 is an illustration of a second possible example of reducing the use of water in a beverage manufacturing operations.

Referring now to FIG. 2 there is shown a second method of conditioning fluid. This method may be applied to the used bottle wash water, to the used CIP rinse, and/or to any other industrial fluid stream. The effluent of this process may be applied as feed fluid to any process stream requiring high purity liquid.

First optionally input fluid (such as bottle wash water) has its temperature reduced to ambient temperature by heat exchanger. Then one or more adsorbents are added to adsorb some of the surfactants and other organics Examples of adsorbents include but not limited to natural or chemically modified clays, activated carbon, polymeric adsorbents, modified silica, inorganic-organic composite nanoparticles or combination thereof. The pH is then reduced to 6.5 to 7.5 to precipitate aluminum. The fluid then passes through a clarifier to remove precipitated solids. Any residual suspended solids are optionally removed by multimedia filter (MMF), sand filter, bag filter, screen filter, microfiltration (MF) or centrifugation. Any colloidal material is then removed by ultrafiltration (UF). Finally dissolved solids are removed by Nanofiltration (NF) and/or reverse osmosis (RO).

This method allows water to be produced with different qualities and therefore may be recycled to CIP, Pasteurizer, cooling tower, boiler, crate washing, belt lube, vacuum pump sealing, floor washing, polymer dilution etc, which all use mostly fresh water. The quantity and quality may be monitored and controlled by IMCA method.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

Samples of water used in bottle washing in a beer brewery were collected for treatment before being introduced into CIP. Tables 1 and 2 show water quality obtained after treatment per first (FIG. 1) and second (FIG. 2) method of this invention.

TABLE 1

Water Quality obtained after treatment with first method of this invention

| Parameter | Bottle Wash Water (BWW) | BWW filtered through 20 micron filter paper | BWW filtered through 10 micron filter paper | BWW filtered through 2.5 micron filter paper | BWW filtered through 0.45 micron filter |
|---|---|---|---|---|---|
| TVC (Total Viable Count) (CFU/Ml) | 1.8E+03 | 8.00E+02 | 1.30E+03 | 4.00E+02 | <1 |
| Ca (CaCO3) (mg/L) | 120 | 80 | 81 | — | 78 |
| Iron (mg/L) | 11 | 3.6 | 3.8 | — | 2.4 |
| Conductivity (µS/cm) | 28000 | 28000 | 27000 | — | 28000 |
| pH | 13.1 | 13.1 | 13.1 | 13.1 | 13.1 |
| Turbidity (NTU) | 450 | 95 | 90 | — | 14 |

As seen from Table 1, filtration of bottle wash water at the natural pH with various pore size papers, significant level of contaminants such as iron, TVC, calcium and turbidity could be reduced while maintaining the pH. This water may be used for first rinse of CIP process.

TABLE 2

Water quality after treatment by second method of this invention

| Parameters (ppm) | Bottle Wash Water | After Chemical Pre-treatment | After Ultrafiltration | After Reverse Osmosis (Single Pass) |
|---|---|---|---|---|
| Aluminum | 140 | <0.30 | <0.30 | <0.30 |
| Silica | 38 | 11 | 13 | 0.2 |
| Sodium | 1700 | 1800 | 1900 | 51 |
| Chloride | 357 | 2350 | 2440 | 64.7 |
| Total Alkalinity | 4900 | 260 | 250 | 6.2 |
| Ortho Phosphate | 7 | <0.3 | <0.3 | <0.3 |
| COD | 503 | 255 | 218 | 10 |
| Conductivity (µS/cm) | 12000 | 8400 | 8600 | 240 |
| Total Hardness | 120 | 140 | 140 | <1.4 |
| pH | 12.8 | 6.8 | 6.7 | 7 |

The water quality after chemical pre-treatment and ultrafiltration may be used for crate and floor washing whereas the one after RO is suitable for most destinations including cooling tower, boiler, pasteurizer, vacuum pump sealing, CIP etc. within plant, thus allowing flexibility to the user to produce water depending on the quality needed, with net result being fresh water usage reduction.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of recycling water for use in an industrial process comprising the steps of:
    collecting a fluid used to rinse bottles, wherein the fluid comprises aluminum, residual solids, a colloid, dissolved matter, and a surfactant;
    reducing a temperature of the fluid to ambient temperature,
    adding an adsorbent to adsorb the surfactant in the fluid,
    precipitating the aluminum by reducing the pH to 6.5 to 7.5, wherein the reducing the pH is performed after adding the adsorbent,
    clarifying the fluid to remove precipitated solids,
    removing residual solids from the fluid by a method selected from the group consisting of: multi-media filter, microfiltration, centrifugation, and any combination thereof,
    removing the colloid from the fluid by ultrafiltration, and
    removing dissolved matter from the fluid by a method selected from the group consisting of nanofiltration, reverse osmosis, and any combination thereof.

2. The method of claim 1, further comprising passing the fluid to an industrial process fluid stream selected from the group consisting of: clean in place, pasteurizing, cooling tower, boiler, crate washing, belt lube, vacuum pump sealing, floor washing, and any combination thereof, wherein passing the fluid to the industrial process is performed after completing the steps of claim 1.

3. The method of claim 1, further comprising adding fresh water to the fluid to be used in the industrial process, wherein the fresh water is added in an amount insufficient for the industrial process to be successfully completed but for the presence of the fluid.

4. The method of claim 1, wherein the aluminum is precipitated by reducing the pH to 6.5.

5. The method of claim 1, wherein the adsorbent is a natural or chemically modified clay, activated carbon, a polymeric adsorbent, modified silica, an inorganic-organic composite nanoparticle, or combination thereof.

* * * * *